Figure 1:
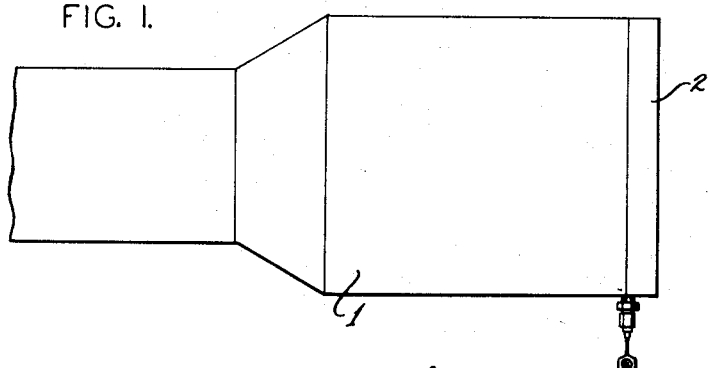

Sept. 29, 1953   M. G. SCHERBERG   2,653,805
INTERMITTENT FUEL INJECTION VALVE
Filed Dec. 8, 1947   2 Sheets-Sheet 1

INVENTOR:
Max G. Scherberg,
By Carr & Carr & Gravely,
HIS ATTORNEYS.

Sept. 29, 1953 M. G. SCHERBERG 2,653,805
INTERMITTENT FUEL INJECTION VALVE
Filed Dec. 8, 1947 2 Sheets-Sheet 2
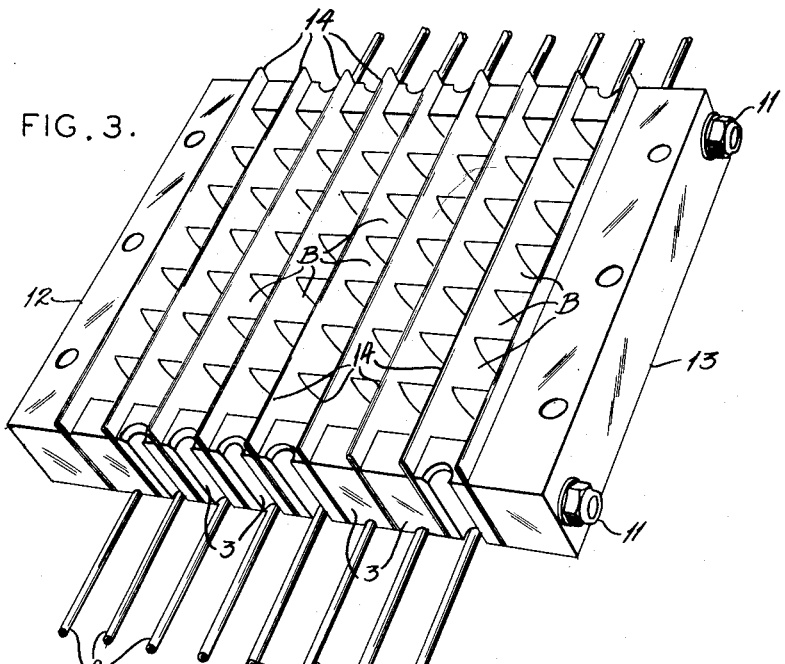
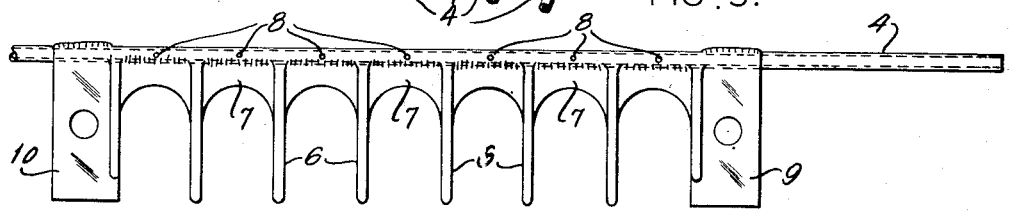
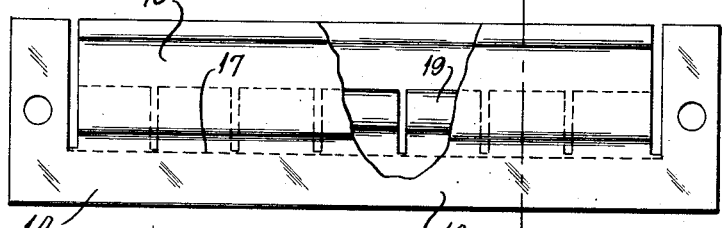
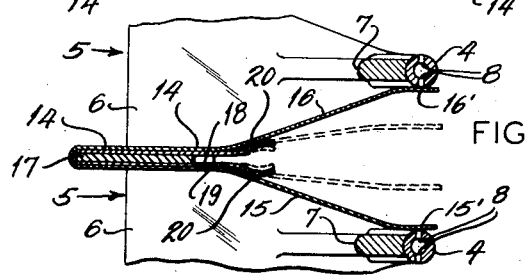
INVENTOR:
Max G. Scherberg,
By Carr & Carr & Gravely,
HIS ATTORNEYS.

Patented Sept. 29, 1953

2,653,805

UNITED STATES PATENT OFFICE 2,653,805

INTERMITTENT FUEL INJECTION VALVE

Max G. Scherberg, Vinita Terrace, Mo., assignor to McDonnell Aircraft Corporation, St. Louis, Mo., a corporation of Maryland Application December 8, 1947, Serial No. 790,429

3 Claims. (Cl. 261—62)

This invention relates to pulse jet engines and is more particularly directed to an improved air inlet valve and fuel injection system for the engine.

One of the objects of the invention is to provide for intermittent fuel injection into the combustion chamber of a pulse jet engine in order to provide a more uniform fuel-air mixture during the charging or intake phase of the engine cycle to thereby produce a more efficient engine operation.

Another object of the invention is to provide for the cooling of the vanes and reeds by means of the flowing fuel, thus prolonging the life or period of use of the reeds and vanes.

Still another object of the invention is to provide fuel or liquid seats for the reeds to cushion their closing action in order to prolong the period of life or use of the reeds.

A further object of the invention is to provide an intake valve mechanism for a pulse jet engine that will increase the atomization of fuel by the action of the reeds in the valve on the fuel.

Another object of the invention is to produce a combination fuel and air inlet valve in which the fuel inlets are uniformly distributed over the entire effective surface of a reed type valve to thereby provide a more uniform distribution of fuel and air mixture.

Another object of the invention is to provide for preheating of the fuel in the combination air and fuel inlet valve by reason of the ability of the valve to conduct some of the heat in the combustion chamber to the fuel before its injection into the chamber.

Figure 2:
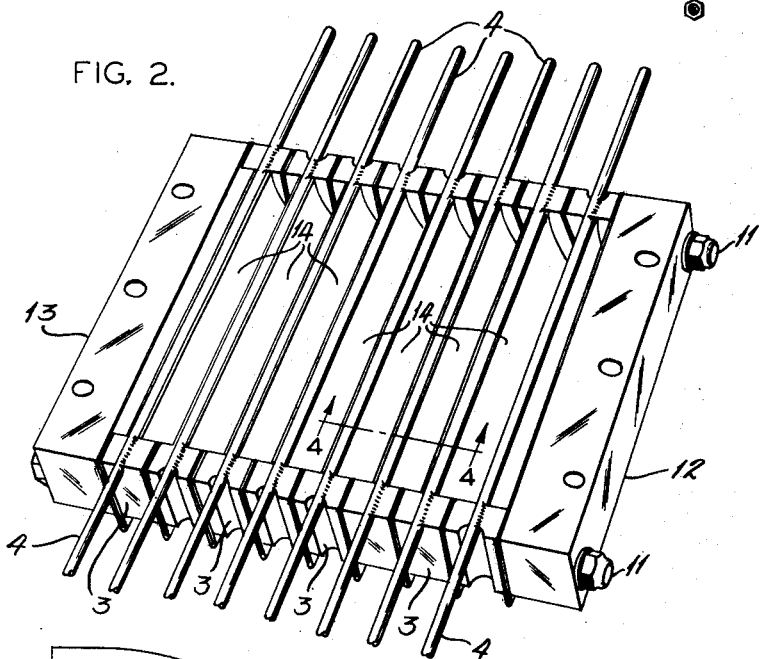
Figure 6:
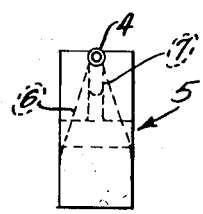
Figure 4:
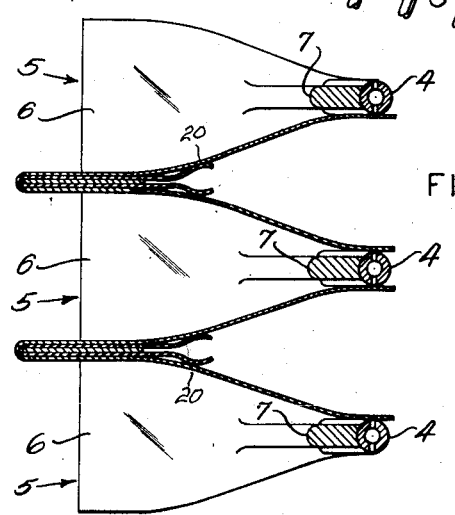

In the drawings:

Fig. 1 schematically illustrates a combustion chamber portion and an intake valve of a pulse jet engine, Fig. 2 is a perspective view of the outlet side of the pulse jet engine valve, Fig. 3 is a perspective view of the inlet side of the pulse jet valve, Fig. 4 is a view taken substantially along the line 4—4 of Fig. 2, Fig. 5 is a side elevational view of one of the vane elements of the inlet valve, Fig. 6 is an end view of the vane structure shown in Fig. 5, Fig. 7 is a side elevational view of one of the reeds employed in the inlet valve; and Fig. 8 is a sectional view taken substantially along the line 8—8 of Fig. 7.

Referring to the drawings, the numeral 1 designates the combustion chamber portion of a pulse jet engine on the bulkhead of which a reed-vane and fuel injection valve assembly 2 is suitably mounted. This valve structure is shown in detailed form in Figs. 2 and 3 and comprises a plurality of vane structures generally indicated at 3 and more particularly illustrated in Figs. 5 and 6. Each of these vane structures consists of a fuel conducting tube 4 or a passageway associated with a casting or other suitably constructed member 5 on which a plurality of vane spacers 6,6 is mounted which form two of the sides of a valve box or cell "B" of which there is a plurality in the valve assembly. Each of the spacers 6 is connected by member 7 to provide a more rigid structure. A plurality of fuel orifices 8 is drilled into the tube 4 or the fuel passageway so that a plurality of nozzles terminates in each valve box. The vanes are provided with end pieces 9 and 10 that are suitably bored so that they may be connected to other vanes by means of a pair of bolts 11 extending through suitable end pieces 12 and 13.

Disposed between each of the several vanes 3 is a plurality of reed structures 14 which are substantially V-shaped and provided with legs 15 and 16, the free ends of which, as viewed in Fig. 8, are substantially horizontal so that the ends 15' and 16' may lie substantially tangent to the tube 4 to thereby cover fuel orifices 8. The legs of these reeds form the other two sides of the valve box or cell described above. Each reed member has assembled therein a spacer 17 that rests at the base of the V member whose primary function is to keep the legs of the reeds 15 and 16 spaced apart in order to prevent a fracture of the metal at the sharp bend in the V. Disposed on each side of the spacer member and within the V are spring members 18 and 19 that extend horizontally to a position on legs 15 and 16 substantially in alignment with bolts 11. The springs 18 and 19 are so shaped at their ends that they will provide a stiffening means for the legs of the reed as it moves in response to pressure differential between the combustion chamber and the atmosphere. The free ends of spring members 18 and 19 are always in contact with legs 15 and 16 at about point 20 on the reeds. As soon as motion of the legs toward each other is initiated, it will continue to a point substantially that indicated by the dotted lines in Fig. 8 wherein springs 18 and 19 will have stored energy and when equalization of pressure occurs between the combustion chamber and the space outside the chamber, they will assist in moving the legs 15 and 16 more rapidly to the full line position indicated in Fig. 8 wherein they are shown in engagement with the sides of tube 4. There is a rolling action between the legs of the reed and the spring members 18 and 19 in their motion toward and away from each other in order to prevent metal fatigue at that point. When the reeds are in the dotted line position, the high stress is removed from a point adjacent the top or face end of the reed, thereby prolonging the life of each of the reeds.

The fuel tubes 4 may be connected by suitable conduit to a pump in order to forcibly introduce fuel into the combustion chamber of the pulse jet engine.

The operation of the pulse jet engine described after the admission of fuel into the combustion chamber is substantially the same as in a conventional pulse jet engine and it is started in the same manner. The operation of the pulse jet is further dependent upon the natural resonating frequency of the engine tube, and the legs of the reeds oscillate at the same frequency or a frequency proportional thereto. Shortly after a charge of fuel and air has been burned, while the reed valve is closed, a low pressure condition is created in the combustion chamber, which action causes external pressure to act upon the legs 15 and 16 of each of the reeds and will move them to the dotted line position shown in Fig. 8. Fuel now flows from the orifices 8 into each valve box "B" and is mixed with the air introduced into the combustion chamber. As soon as the pressure within the combustion chamber equals that outside the chamber, springs 18 and 19 will assist the movement of resilient legs 15 and 16 toward tube 4 to cause portions 15' and 16' to close orifices 8 and prevent any further admission of fuel and air until the same period in the next cycle of engine operation. Combustion now takes place, increasing the pressure in the chamber, thereby imposing a thrust on the engine and simultaneously seating the reeds more firmly over the orifices.

The construction illustrated results in improved performance and a longer period of usefulness of each of the parts of the engine or in a longer life for the several parts. The improved performance or efficiency of a pulse jet engine is dependent upon a plurality of variables that alter the fuel and air mixture introduced into the combustion chamber and is, therefore, a function of the plurality of fuel inlet orifices in the valve and the distribution of the orifices in the valve. Since each valve box "B" has its own individual fuel injection orifices, there will be a more uniform fuel distribution over the full effective area of the valve, resulting in a more complete and more rapid combustion.

The fuel in the tubes 4 is exposed to the heat in the combustion chamber and, therefore, some preheating of the fuel takes place which increases the rapidity of combustion after it enters the combustion chamber. The heat absorbing action of the fuel prevents some of the heat of combustion being transmitted to the vanes and the reeds which are consequently held at a lower temperature, thereby prolonging the life of the reeds and, therefore, their period of usefulness.

The fuel spraying from the orifices 8 impinges on the reed and some flows over the surface thereof. The reeds constantly flap or vibrate when not seated which action promotes and assists in bringing about a more thorough atomization of the fuel. The fuel being introduced into each valve box "B" is similarly acted upon by the reeds therein. The air stream through each valve box also contributes to the mixing of the fuel and air and when combined with the atomizing effect of the flapping reed results in a more thorough combustion of the fuel, therefore, deriving the maximum benefit from each unit of fuel.

Fuel is introduced into the engine at a plurality of places at the point of entrance and, therefore, it need travel only a short distance. By reason of this fact, only a very small pressure is required to force the fuel out of the orifices.

After the admission of air into the combustion chamber, the reeds are forced against the fuel tube 4 under the force of springs 18 and 19 and the inherent resilience of the reeds. The impact of the reeds on the fuel tube is cushioned by reason of the fuel covering the tube and the vane spacers. This fuel covering also acts as a seal to aid in preventing fuel leakage. The life of the reeds is increased by reason of the cushioning action of the fuel that flows over them and over the vanes and the rolling action that takes place between the springs and the reeds is also facilitated thereby, preventing metal fatigue at the point of contact of the springs with the reeds. In actual construction, the reeds are bowed slightly away from the vanes so that when the pressure is increased in the combustion chamber they will be forced against the vanes with a rolling action and because fuel covers both reeds and vanes, wear will be prevented or minimized, thereby increasing the life of the reeds and vanes.

Under certain circumstances it is desirable, in the operation of a pulse jet engine, to utilize the sub-atmospheric condition in the combustion chamber for the purpose of injecting fuel therein by the movement of the air past the orifices rather than relying upon a pressurized fuel supply. Certain changes in the size or number or distribution of the openings and of the orifices 8, however, may be found necessary in order to properly utilize the pressure differential which is relied upon to introduce fuel into the combustion chamber. The introduction of fuel by this method will also be periodic for the reasons set forth above. In utilizing the sub-atmospheric condition of the combustion chamber the pressure producing apparatus to supply fuel to the nozzles in other constructions is eliminated and enables the aircraft to sustain or carry that much more pay load.

From the foregoing it should be clear that in constructions embodying the principles above described, the output of the pulse jet engine may be varied by varying the number of nozzles in the valve and altering the distribution of the nozzles in the several valve boxes. Experience has proven that the fuel consumption for any given desired thrust output is materially reduced by the use of the valve above described and that it results in a more thorough mixing of fuel and air because this mixing commences at the point of entry and thereby produces a higher degree of combustion and more efficient utilization of the energy contained in each fuel unit.

What I claim is.

1. An air and fuel flow regulator for reaction engines comprising a plurality of fuel conducting tubes having discharge orifices on opposite sides thereof, vane spacers secured to each of said tubes and distributed uniformly therealong, means on each tube for securing said vane spacers and tube assemblies, a reed valve member disposed between adjacent vane spacers and tubes, each valve including diverging resilient legs normally adapted to abut the edges of said vane spacers and to close the orifices in the adjoining tubes; and leaf springs associated with said reed valve members for assisting the diverging legs into engagement with the fuel tubes for preventing discharge of fuel from the orifices.

2. An air and fuel flow regulator for reaction engines comprising a plurality of fuel conducting tubes provided with discharge orifices on opposite sides thereof, a plurality of vane spacers along each of said tubes, a reed assembly disposed between each tube and its associated vane spacers, each reed assembly comprising diverging resilient legs adapted to abut the vane spacers and normally cover the orifices in said tubes, an auxiliary leaf spring in each reed assembly for reinforcing the resiliency of said legs; and means for securing said vane spacers, fuel tubes, reeds and reinforcing springs in a unitary assembly.

3. An air and fuel flow regulator comprising a plurality of uniformly spaced fuel tubes having a series of discharge orifices on opposite sides thereof, a plurality of vane spacers uniformly distributed along each tube, said discharge orifices arranged between said vane spacers, a reed valve disposed between each of said tube and vane spacer assemblies, said reed engaging the vane spacers on each tube and normally covering the discharge orifices therein, said reed covering said orifices when pressure on each side thereof is equal and uncovering the orifices when the pressure is unequal, each of said reeds consisting of diverging legs engaging one side of adjacent vane spacers and covering the orifices on one side of each tube, leaf springs in each reed consisting of diverging legs in engagement with the reed legs for increasing the pressure between the reeds and said tubes; and means for rigidly connecting said tubes and vane spacers, reeds, and leaf springs into a unitary assembly.

MAX G. SCHERBERG.

References Cited in the file of this patent

UNITED STATES PATENTS

| Number | Name | Date |
|---|---|---|
| 1,021,521 | Héroult | Mar. 26, 1912 |
| 1,257,862 | Hess et al. | Feb. 26, 1918 |
| 1,625,787 | Braselton | Apr. 26, 1927 |
| 2,142,601 | Bleecker | Jan. 3, 1939 |
| 2,432,213 | Rutishauser | Dec. 9, 1947 |
| 2,505,757 | Dunbar | May 2, 1950 |

FOREIGN PATENTS

| Number | Country | Date |
|---|---|---|
| 502,527 | Great Britain | Mar. 20, 1939 |
| 506,233 | Great Britain | May 24, 1939 |

OTHER REFERENCES

"Theory and Testing of Jet Propulsion Motors and Rockets" by S. Fonberg, published by P. P. Agency, London 1945, page 22.